United States Patent
Takizawa

(10) Patent No.: US 9,136,695 B2
(45) Date of Patent: Sep. 15, 2015

(54) PROTECTION CONTROL SYSTEM FOR A MULTILEVEL POWER CONVERSION CIRCUIT

(71) Applicant: FUJI ELECTRIC CO., LTD., Kawasaki-shi (JP)

(72) Inventor: Satoki Takizawa, Hino (JP)

(73) Assignee: FUJI ELECTRIC CO., LTD. (JP)

( * ) Notice: Subject to any disclaimer, the term of this patent is extended or adjusted under 35 U.S.C. 154(b) by 256 days.

(21) Appl. No.: 13/916,707

(22) Filed: Jun. 13, 2013

(65) Prior Publication Data

US 2013/0343103 A1 Dec. 26, 2013

(30) Foreign Application Priority Data

Jun. 14, 2012 (JP) ................................. 2012-134361

(51) Int. Cl.
   H02H 7/12 (2006.01)
   H02M 1/32 (2007.01)
   H02M 7/483 (2007.01)

(52) U.S. Cl.
   CPC .............. H02H 7/1203 (2013.01); H02M 1/32 (2013.01); H02M 7/483 (2013.01)

(58) Field of Classification Search
   CPC ....... H02H 7/1203; H02M 1/32; H02M 7/483
   USPC .......................................................... 361/18
   See application file for complete search history.

(56) References Cited

U.S. PATENT DOCUMENTS

| 2008/0315859 A1 | 12/2008 | Ponnaluri et al. |
| 2009/0195068 A1 | 8/2009 | Ohashi et al. |
| 2011/0012543 A1* | 1/2011 | Takizawa et al. ............. 318/139 |
| 2012/0018777 A1* | 1/2012 | Takizawa ...................... 257/140 |

FOREIGN PATENT DOCUMENTS

| EP | 2487786 A2 | 8/2012 |
| JP | 2009-525717 A | 7/2009 |
| JP | 2009-177951 A | 8/2009 |
| JP | 2012-182974 A | 9/2012 |

OTHER PUBLICATIONS

Technical Report of the Institute of Electrical Engineers of Japan, No. 1,093.

* cited by examiner

*Primary Examiner* — Thienvu Tran
*Assistant Examiner* — Kevin J Comber
(74) *Attorney, Agent, or Firm* — Rossi, Kimms & McDowell LLP

(57) ABSTRACT

Aspects of the invention are directed to a protection control system of the invention is a protection control system for a multilevel power conversion circuit of a flying capacitor type, the power conversion circuit including six semiconductor switches of first through sixth semiconductor switches sequentially connected in series from a positive terminal to a negative terminal of a DC power supply, a first capacitor connected between the connection point of the second and third semiconductor switches and the connection point of the fourth and fifth semiconductor switches and a second capacitor connected between the connection point of the first and second semiconductor switches and the connection point of the fifth and sixth semiconductor switches, wherein the protection control system of the invention turns ON the second semiconductor switch or maintains the second semiconductor switch in an ON state, in the case of short-circuit fault of the third semiconductor switch.

8 Claims, 12 Drawing Sheets

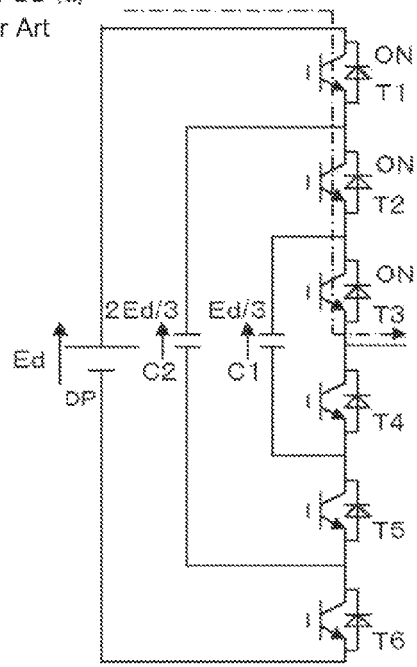
FIG. 11 (a) Prior Art
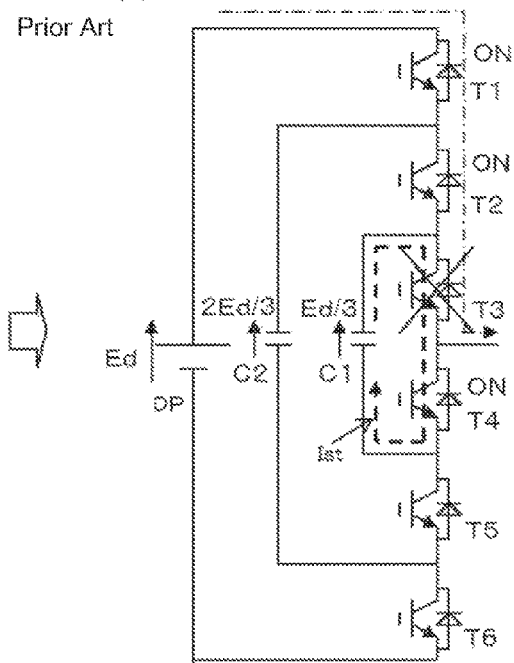
FIG. 11 (b) Prior Art
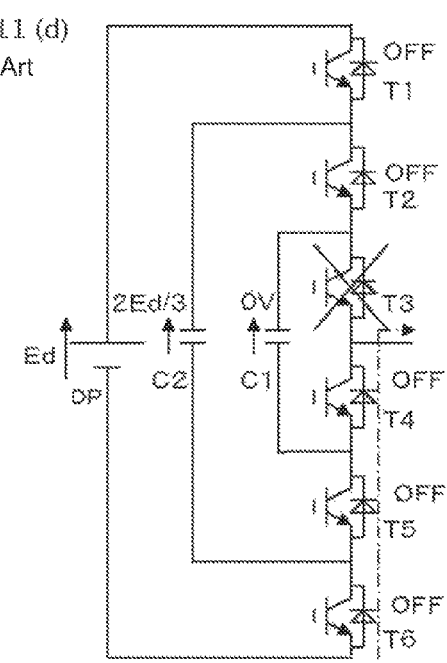
FIG. 11 (d) Prior Art
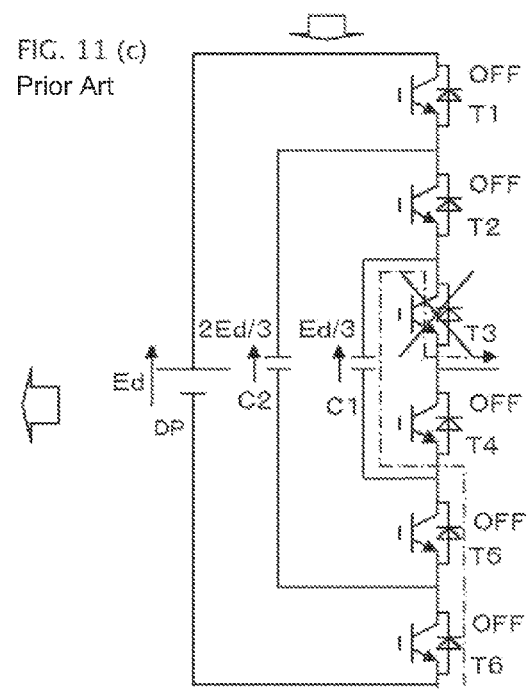
FIG. 11 (c) Prior Art

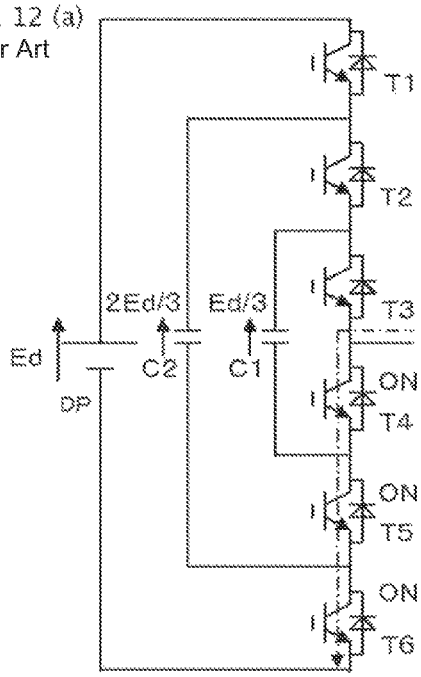
FIG. 12 (a) Prior Art
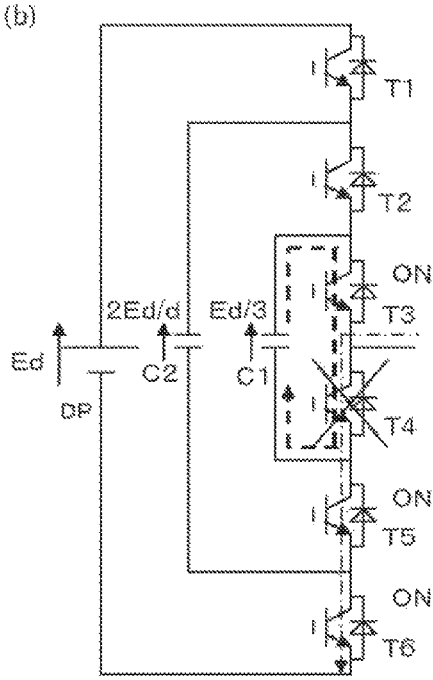
FIG. 12 (b) Prior Art
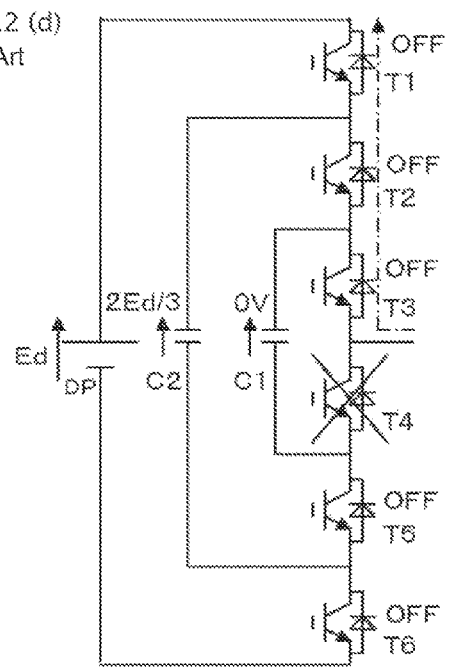
FIG. 12 (d) Prior Art
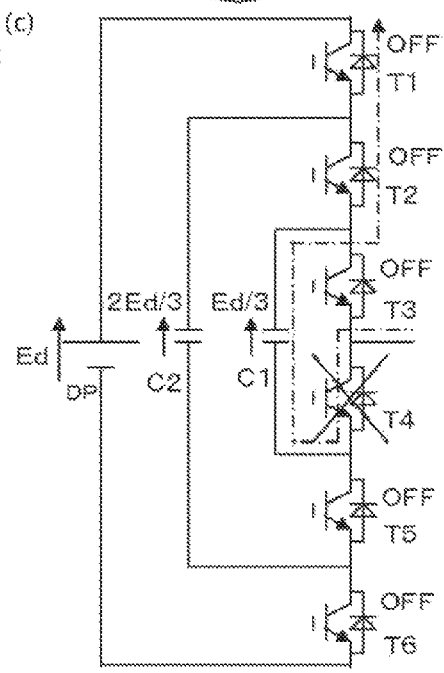
FIG. 12 (c) Prior Art

PROTECTION CONTROL SYSTEM FOR A MULTILEVEL POWER CONVERSION CIRCUIT

BACKGROUND OF THE INVENTION

1. Field of the Invention

The present invention relates to a protection control system for a multilevel power conversion circuit of a flying capacitor type for AC motor driving and other applications.

2. Description of the Related Art

FIG. 4 shows a general type of power conversion circuit for converting a DC power to an AC power. A DC power supply DP delivers a voltage Ed between the positive electric potential terminal P and a negative electric potential terminal N. The DC power supply can be generally composed of an AC power supply system using a rectifier and a capacitor with a large capacitance, though those components of the AC power supply system are not shown in the figure.

The power conversion circuit comprises semiconductor switches Q1 through Q6 each composed of an IGBT and a diode, gate driving circuits GD1 through GD6 for driving the IGBTs, and a controller CNT. An example of a load on this power conversion circuit is an AC motor ACM. The semiconductor switches Q1 through Q6 are ON/OFF controlled by the gate driving circuits GD1 through GD6 according to the ON/OFF command of the controller CNT. The power conversion circuit of this construction can deliver an output voltage of the electric potential P or N of the DC power supply DP to the AC output terminal by the switching operation of the IGBTs. Thus, this converter is a two-level power conversion circuit.

FIG. 5 shows a four-level power conversion circuit of a flying capacitor type. This circuit comprises: six semiconductor switches, which are IGBTs, T1 through T6 connected in series between the positive electric potential terminal P and the negative electric potential terminal N of the DC power supply DP, a capacitor C1 connected between the collector of the IGBT T3 and the emitter of the IGBT T4, and a capacitor C2 connected between the collector of the IGBT T2 and the emitter of the IGBT T5. The capacitors C1 and C2 are called flying capacitors. The voltages across the capacitors C1 and C2 are controlled to be, in average, ⅓ Ed and ⅔ Ed, respectively, where Ed is the output voltage of the DC power supply DP. The connection point between the emitter of the IGBT T3 and the collector of the IGBT T4 is an AC output terminal in this circuit construction. This circuit is a four-level power conversion circuit that delivers the four levels of electric potentials given in the following.

| | |
|---|---|
| Mode (1) | Ed when T1, T2, and T3 are ON |
| Mode (2) | Ed - 1/3 Ed when T1, T2, and T4 are ON |
| Mode (3) | Ed - 2/3 Ed when T1, T5, and T4 are ON |
| Mode (4) | 0 + 2/3 Ed when T6, T2, and T3 are ON |
| Mode (5) | 0 + 1/3 Ed when T6, T5, and T3 are ON |
| Mode (6) | 0 when T6, T5, and T4 are ON |

The modes (2) and (4) give an equal voltage, and the modes (3) and (5) give an equal voltage as well. But the capacitors C1 and C2 undergo either charging or discharging action. Thus, selectively controlling the output time allows the voltages across the capacitors C1 and C2 maintained, in average, at ⅓ Ed and ⅔ Ed, respectively.

Each IGBT is subjected to a voltage of Ed/3 in a steady state. Considering a surge voltage emerging in a transient phenomenon at a switching action, a substantially required withstand voltage for the IGBTs should be about ⅔ Ed, which is twice the steady state value.

FIG. 6 shows a five-level power conversion circuit of a flying capacitor type, which is an advanced form of the circuit of FIG. 5. Controlling the voltage across the capacitor C1 at Ed/4, the voltage across the capacitor C2 at Ed/2, and the voltage across the capacitor C3 at 3Ed/4, the power conversion circuit gives five levels of electric potential of Ed, 3Ed/4, Ed/2, Ed/4, and 0 (zero) at the AC output terminal.

FIG. 7 is a six-level power conversion circuit. Controlling the voltage across the capacitor C1 at Ed/5, the voltage across the capacitor C2 at 2Ed/5, the voltage across the capacitor C3 at 3Ed/5, and the voltage across the capacitor C4 at 4Ed/5, the power conversion circuit gives six levels of electric potential of Ed, 4Ed/5, 3Ed/5, 2Ed/5, Ed/5, and 0 (zero) at the AC output terminal.

FIG. 8 shows a power conversion circuit composed by blending a neutral point clamped type (an NPC type) conversion circuit with a flying capacitor type conversion circuit. This power conversion circuit comprises, in addition to the four-level power conversion circuit of a flying capacitor type shown in FIG. 5, a pair of series-connected IGBTs T7 and T8 in parallel to the capacitor C2, and a bidirectional switch composed of a pair of antiparallel-connected reverse blocking IGBTs T9 and T10, the bidirectional switch being connected between the point of series-connection of the IGBTs T7 and T8 and the point of series connection of a DC power supply DP1 and a DC power supply DP2. The power conversion circuit of FIG. 8 is a seven-level power conversion circuit. The examples of power conversion circuits mentioned above are disclosed in a Japanese Translation of PCT International Application No. 2009-525717, and Technical Report of The Institute of Electrical Engineers of Japan, No. 1,093 (in Japanese), FIGS. 2.2 and 2.3 in particular.

A short-circuited state usually occurs when a semiconductor switch composing a power conversion circuit breaks down for some reason. FIG. 9 shows short-circuit current running in a short-circuit fault in a two level inverter circuit. When a short-circuit fault occurs at the IGBT T2 in the circuit of FIG. 9 and then an ON command is given to the IGBT T1, a DC short-circuit current Ist flows in the path designated by the broken line in the figure. If this state continues for a certain period of time, the IGBT T1 also breaks down leading to a complete DC short-circuit state, increasing the damage of the power conversion system. In order to avoid such a situation, the gate driving circuit GD for each IGBT is usually provided with an arm short-circuit detecting circuit and a short-circuit protecting circuit that forcedly interrupts the IGBT upon detection of a short-circuit event.

FIG. 10 shows such a gate driving circuit. The gate driving circuit gives an ON/OFF signal for a gate-emitter voltage of the IGBT T0 through electrical insulation by a photo-coupler PC1. When an ON signal is given through the photo-coupler PC1, a transistor Qa turns ON and the positive side power supply Ep performs forward bias driving the gate-emitter voltage of the IGBT T0 through a resistance RG. Thus, the IGBT T0 is turned ON. When an OFF signal is given through the photo-coupler PC1, a transistor Qb turns ON and the negative side power supply En performs reverse bias driving the gate-emitter voltage of the IGBT T0 through a resistance RG. Thus, the IGBT T0 is turned OFF. A short-circuit protection circuit that forcedly interrupts the IGBT T0 in the event of overcurrent is composed of a diode Dc, a resistor R1, a capacitor Cd, a Zener diode ZD, a transistor Qc, and a diode Dd. If an overcurrent flows through the IGBT T0 in the period of ON signal, the collector-emitter voltage of the IGBT T0 rises causing a non-conducting state of the diode Dc. Consequently the transistor Qc turns ON and then the transistor Qb turns ON to interrupt the IGBT T0 forcedly. A photo-coupler PC2 is a short-circuit detecting circuit that feeds back information of overcurrent interruption event to a control circuit.

Although the example of FIG. 9 is a two-level circuit, a multi-level circuit as shown in FIG. 5 is also operated similarly. When the IGBT T3 (or T4) undergoes a short-circuit fault, if another normal IGBT T4 (or T3) turns ON, the capacitor C1 becomes short-circuited. Accordingly, the IGBT T4 (or T3) is forcedly turned OFF with the gate driving circuit thereof. When the IGBT T2 (or T5) undergoes a short-circuit fault, if another normal IGBT T5 (or T2) is in an ON state, the capacitor C1 and C2 becomes short-circuited. Accordingly, the IGBT T5 (or T2) is forcedly turned OFF with the gate driving circuit thereof. When the IGBT T1 (or T6) undergoes a short-circuit fault, if another normal IGBT T6 (or T1) is in an ON state, the capacitor C2 and the power supply DP becomes short-circuited. Accordingly, the IGBT T6 (or T1) is forcedly turned OFF with the gate driving circuit thereof. The circuits of FIG. 6 and FIG. 7 are similarly operated.

Now, the operation on the short circuit fault of the IGBT T3 in the circuit of FIG. 5 is more closely considered. Referring to FIGS. 11(a)-11(d), from the state (a) in which electric current from the DC power supply DP flows through the path of IGBT T1→T2→T3 to a load, the state transfers to the state (b) in which the IGBT T3 is short-circuited. When an ON signal is given to the IGBT T4 in this state (b), short circuit current Ist flows as indicated by the broken line. In that state, the gate driving circuit for the IGBT T4 detects the short-circuit event and forcedly interrupts the IGBT T4. At the same time, a short-circuit fault detection signal is transmitted through the photo-coupler PC2 in FIG. 10 to the control device, which delivers an interruption signal to every IGBT. As a result, the current running through the load flows in the state (c) of FIGS. 11(a)-11(d) through the path of: the diode of the IGBT T6→the diode of the IGBT T5→the capacitor C1→the IGBT T3. Since the IGBT T3 is in the short-circuited state in this time, the current flows through the capacitor C1 and the capacitor C1 continues to discharge until the voltage $V_{C1}$ across the capacitor C1 decreases to zero volts at which the diode of the IGBT T4 turns to a conductive state. Thus, the current flows in the path indicated in the state (d) of FIGS. 11(a)-11(d). At this state, the voltage $V_{C2}$ across the capacitor C2 is about 2Ed/3, and so the IGBT T2 is subjected to the voltage $V_{T2}=V_{C2}\approx 2Ed/3$.

FIGS. 12(a)-12(d) shows operation in the case of a fault of the IGBT T4, which is basically similar to the one shown in FIGS. 11(a)-11(d). Referring to FIGS. 12(a)-12(d), from the state (a) in which electric current from the load flows through the path of IGBT T4→T5→T6, the state transfers to the state (b) in which the IGBT T4 is short-circuited. When an ON signal is given to the IGBT T3 in this state (b), short circuit current Ist flows as indicated by the broken line. In that state, the gate driving circuit for the IGBT T3 detects the short-circuit event and forcedly interrupts the IGBT T3. At the same time, a short-circuit fault signal is transmitted through the photo-coupler PC2 in FIG. 10 to the control device, which delivers an interruption signal to every IGBT. As a result, the current running through the load flows in the state (c) of FIGS. 12(a)-12(d) through the path of: the IGBT T4→the capacitor C1→the diode of the IGBT T2→the diode of the IGBT T1. Since the IGBT T4 is in the short-circuited state in this time, the current flows through the capacitor C1 and the capacitor C1 continues to discharge until the voltage $V_{C1}$ across the capacitor C1 decreases to zero volts at which the diode of the IGBT T3 turns to a conductive state. Thus, the current flows in the path indicated in the state (d) of FIGS. 12(a)-12(d). At this state, the voltage $V_{C2}$ across the capacitor C2 is about 2Ed/3, and so the IGBT T5 is subjected to the voltage $V_{T5}=V_{C2}\approx 2Ed/3$.

In these cases, a withstand voltage of at least 2Ed/3 is required by the IGBT T2 in the case of fault of T3 and by the IGBT T5 in the case of fault of T4.

Actually, these IGBTs need a withstand voltage of about Ed that is the voltage of the DC power supply DP. In the normally operating state mentioned earlier, these IGBTs need only about 2Ed/3 that is twice the voltage steadily subjected to. However, the IGBTs are required to exhibit a withstand voltage higher than the value as described above. This leads to an enlarged size and an increased cost. Thus, there is a need in the art for an improved protection control system.

SUMMARY OF THE INVENTION

Embodiments of the invention address these and other needs. Some embodiments provide such a protection control system for a multilevel power conversion circuit that when an IGBT become accidentally short-circuited, the voltage experienced by a normally operating IGBT is suppressed low without unnecessarily increasing the withstand voltage of the IGBT, thereby providing a system with a reduced size and at a low cost.

Some embodiments provide a protection control system for a multilevel power conversion circuit of the first aspect of the present invention is a protection control system for a multilevel power conversion circuit of a flying capacitor type for converting a DC power into an AC power or converting an AC power into a DC power, one phase portion of the power conversion circuit comprising: six semiconductor switches of first through sixth semiconductor switches sequentially connected in series from a positive terminal to a negative terminal of a DC power supply circuit, each semiconductor switch having an antiparallel-connected diode; a gate driving circuit with an arm short-circuit protection circuit connected to a gate of each semiconductor switch; a first capacitor connected between a connection point of the second and third semiconductor switches and a connection point of the fourth and fifth semiconductor switch; a second capacitor connected between a connection point of the first and second semiconductor switches and a connection point of the fifth and sixth semiconductor switches; and an AC terminal at a connection point of the third and fourth semiconductor switches; wherein the protection control system turns ON the second semiconductor switch or maintains the second semiconductor switch in an ON state, in a case of short-circuit fault of the third semiconductor switch.

A protection control system for a multilevel power conversion circuit of a second aspect of the present invention is a protection control system for a multilevel power conversion circuit of a flying capacitor type for converting a DC power into an AC power or converting an AC power into a DC power, one phase portion of the power conversion circuit comprising: six semiconductor switches of first through sixth semiconductor switches sequentially connected in series from a positive terminal to a negative terminal of a DC power supply circuit, each semiconductor switch having an antiparallel-connected diode; a gate driving circuit with an arm short-circuit protection circuit connected to a gate terminal of each semiconductor switch; a first capacitor connected between a connection point of the second and third semiconductor switches and a connection point of the fourth and fifth semiconductor switch; a second capacitor connected between a connection point of the first and second semiconductor switches and a connection point of the fifth and sixth semiconductor switches; and an AC terminal at a connection point of the third and fourth semiconductor switches; wherein the protection control system turns ON the fifth semiconductor switch or maintains the fifth semiconductor switch in an ON state, in a case of short-circuit fault of the fourth semiconductor switch.

A protection control system for a multilevel power conversion circuit of a third aspect of the present invention is the protection control system for a multilevel power conversion circuit according to the first or second aspect of the invention, wherein the second or fifth semiconductor switch is turned OFF when the voltage across the second capacitor decreases to a predetermined voltage value after the second or fifth semiconductor switch has been turned ON.

A protection control system for a multilevel power conversion circuit of a fourth aspect of the present invention is the protection control system for a multilevel power conversion circuit according to the third aspect of the invention, wherein the predetermined voltage value is approximately 50% of a voltage value of the DC power supply.

A protection control system for a multilevel power conversion circuit of a fifth aspect of the present invention is the protection control system for a multilevel power conversion circuit according to the third aspect of the invention, wherein the multilevel power conversion circuit is a multilevel power conversion circuit of a flying capacitor type in combination with a neutral point clamped circuit that is additionally provided and composed of a semiconductor switch for clamping the electric potential of the second capacitor at a neutral point electric potential of the DC power supply, and the predetermined voltage value is approximately ⅙ of a voltage value of the DC power supply.

A protection control system for a multilevel power conversion circuit of a sixth aspect of the present invention is a protection control system for a five-level or more levels of power conversion circuit of a flying capacitor type for converting a DC power into an AC power or converting an AC power into a DC power, one phase portion of the power conversion circuit comprising: 2 N pieces of semiconductor switches, N being an integer of four or larger, sequentially connected in series from a positive terminal to a negative terminal of a DC power supply circuit, each semiconductor switch having an antiparallel-connected diode; a gate driving circuit with an arm short-circuit protection circuit connected to a gate terminal of each semiconductor switch; and (N−1) pieces of capacitors connected between a connection point of the (N−I+1)-th and (N−I)-th semiconductor switches and a connection point of the (N+I)-th and (N+I+1)-th semiconductor switches, I being an integer from 1 to (N−1); wherein when a J-th semiconductor switch, J being an integer from 3 to (2N−2), becomes in a short-circuit fault state, short-circuit current is interrupted by a normally operating semiconductor switch in which the short-circuit current running through the semiconductor switch in the short-circuit fault state flows, and the protection control system turns ON, or maintains in an ON state, the (J−1)-th semiconductor switch if J≤N or the (J+1)-th semiconductor switch if J≥(N+1), which is then turned OFF when the voltage across the (J+1)-th capacitor decreases to a predetermined voltage value.

A protection control system for a multilevel power conversion circuit of a seventh aspect of the present invention is the protection control system for a multilevel power conversion circuit according to the sixth aspect of the invention, wherein the predetermined voltage value is approximately a middle voltage value between a final voltage value that the (J−1)-th capacitor reaches and a voltage value of the (J+2)-th capacitor.

A protection control system for a multilevel power conversion circuit of a seventh aspect of the present invention is the protection control system for a multilevel power conversion circuit according to the sixth aspect of the invention, wherein the multilevel power conversion circuit is a multilevel power conversion circuit of a flying capacitor type in combination with a neutral point clamped circuit that is additionally provided and composed of a semiconductor switch for clamping the electric potential of either one of the (N−1) pieces of capacitors at a neutral point electric potential of the DC power supply, and the predetermined voltage value is approximately an average voltage value of the (J−2)-th capacitor in a normally operating state.

In a protection control system for a multilevel power conversion circuit of a flying capacitor type of embodiments of the present invention, in the case of a short-circuit fault of a semiconductor switch, another semiconductor switch through which discharge current from a flying capacitor flows is interrupted by a short-circuit protection circuit of a gate driving circuit and still another semiconductor switch that is connected to the flying capacitor and disposed in the power supply side is turned ON or maintained in an ON state. This semiconductor switch in an ON state is turned OFF when the voltage across another flying capacitor that is connected in the side of power supply with respect to this semiconductor switch is decreased to a predetermined value.

Consequently, such a protection control system for a multilevel power conversion circuit is provided that even when an IGBT become accidentally short-circuited, the withstand voltage of the IGBT need not to be unnecessarily high. Therefore a system with a reduced size and at a low cost is provided.

BRIEF DESCRIPTION OF THE DRAWINGS

FIGS. 11(a)-11(d) show a first operation mode in arm short-circuit protection according to a conventional system; and FIGS. 12(a)-12(d) show a second operation mode in arm short-circuit protection according to a conventional system.

DETAILED DESCRIPTION

In some embodiments, in a protection control system for a multilevel power conversion circuit of a flying capacitor type, in the case of a short-circuit fault of a semiconductor switch, another semiconductor switch through which discharge current from a flying capacitor flows is interrupted by a short-circuit protection circuit of a gate driving circuit and still another semiconductor switch that is connected to the flying capacitor and disposed in the power supply side is turned ON or maintained in an ON state. This semiconductor switch in an ON state is turned OFF when the voltage across another flying capacitor that is connected in the side of power supply with respect to this semiconductor switch is decreased to a predetermined value.

Embodiment Example 1

Figure 1:
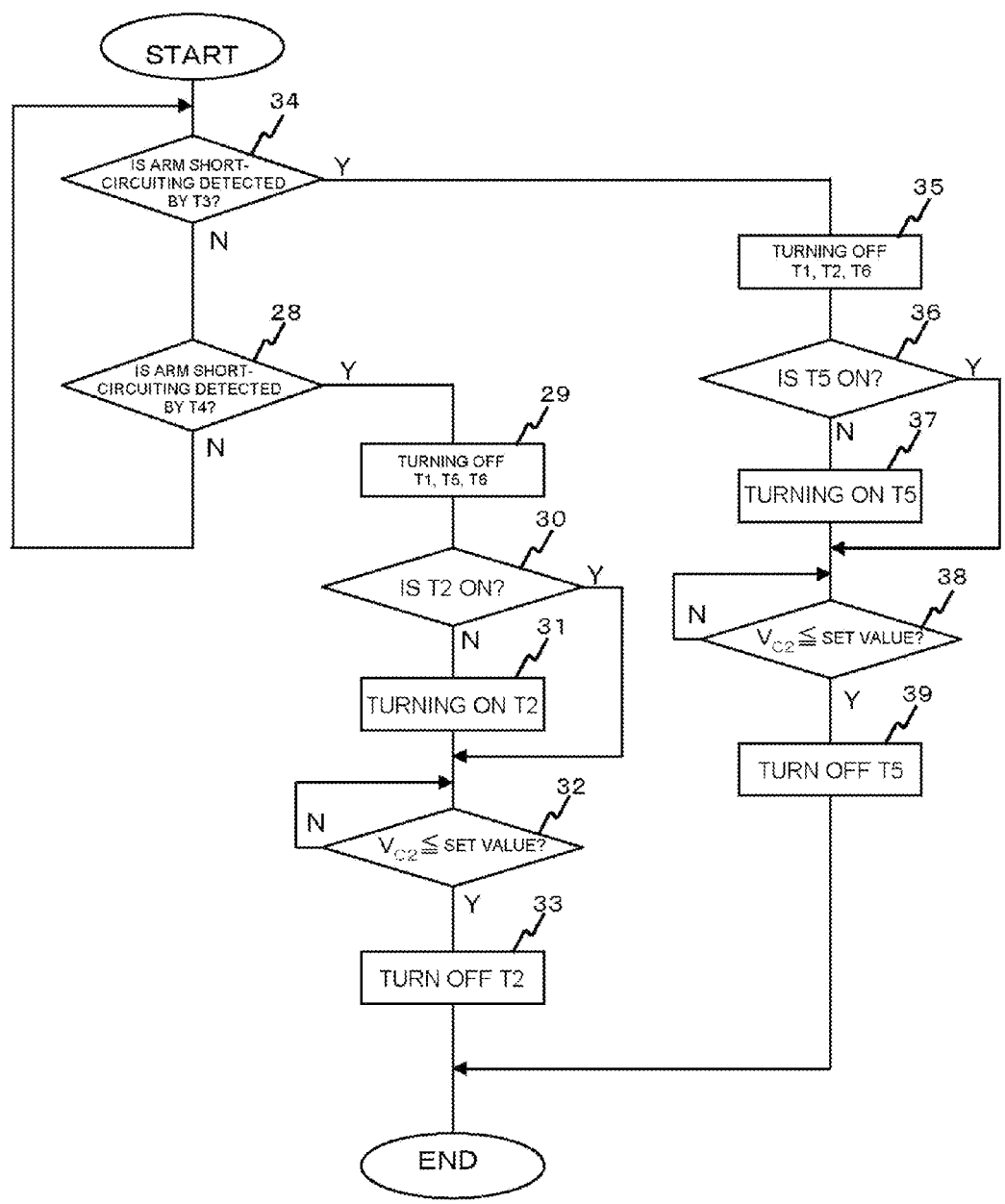
FIG. 1 shows an example of protection operation algorithm according to an embodiment of the present invention.
Figure 2:
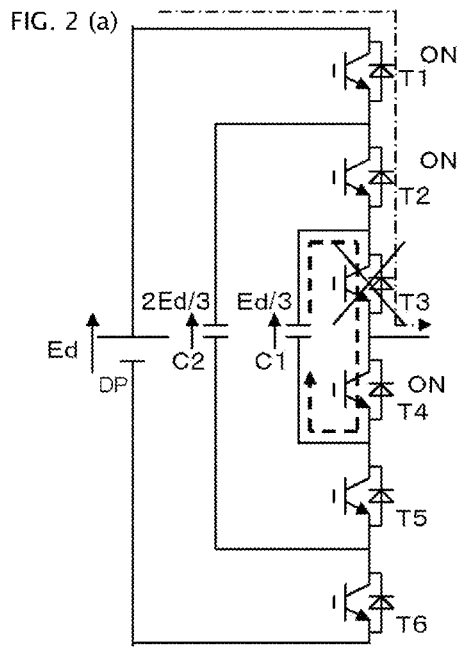
FIGS. 2(a)-2(d) show an example of protection operation mode in the case of a short-circuit fault of IGBT T3.
Figure 2:
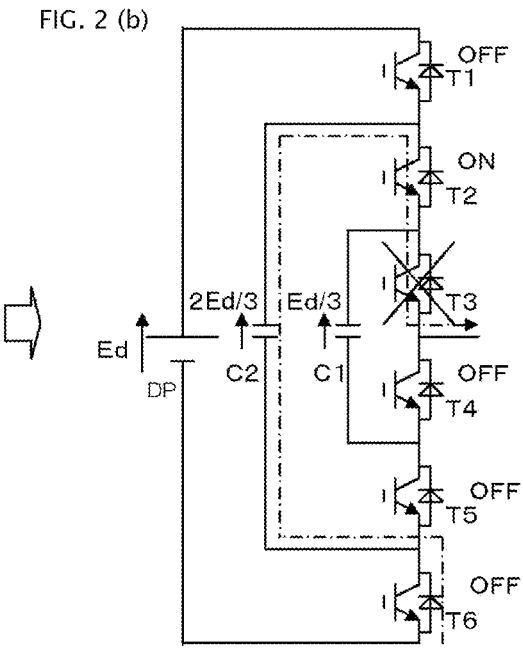
Figure 2:
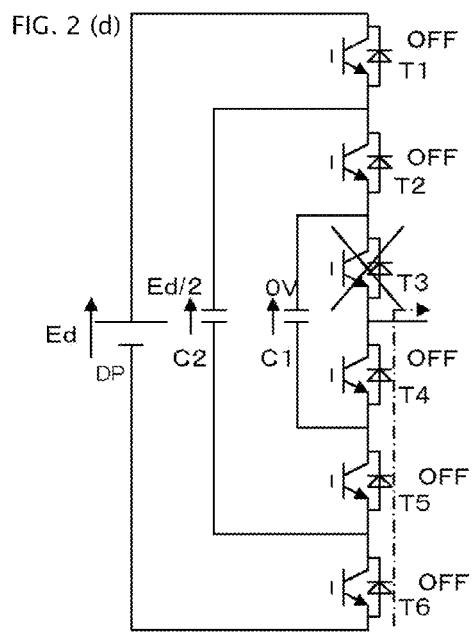
Figure 2:
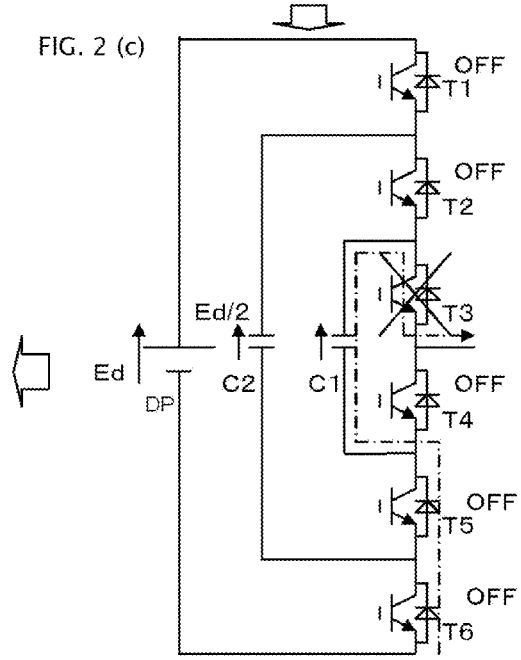
Figure 3:
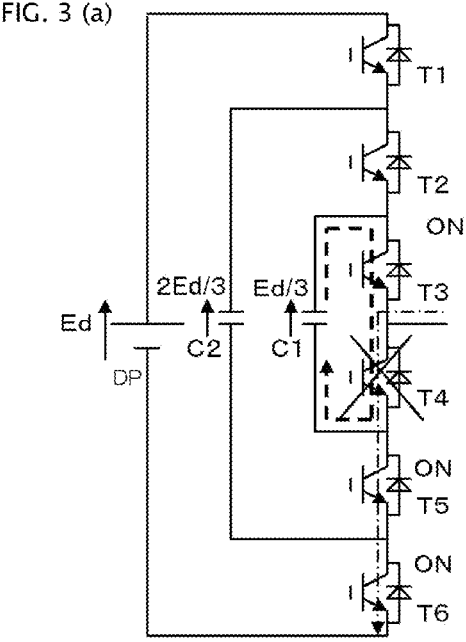
FIGS. 3(a)-3(d) show an example of protection operation mode in the case of a short-circuit fault of IGBT T4.
Figure 3:
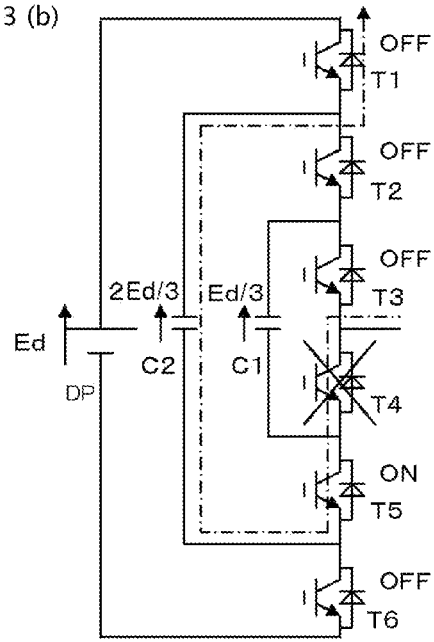
Figure 3:
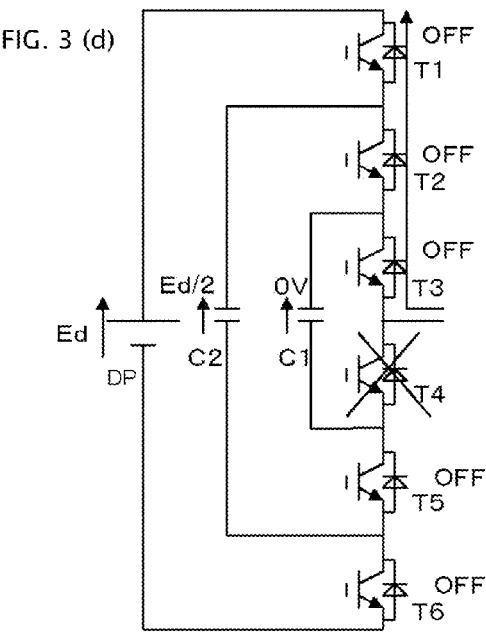
Figure 3:
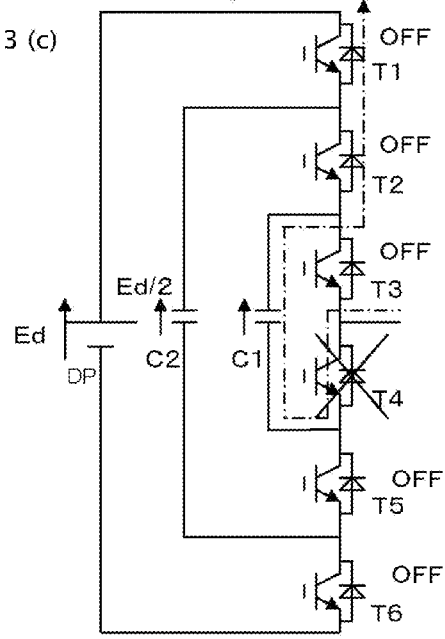
Figure 4:
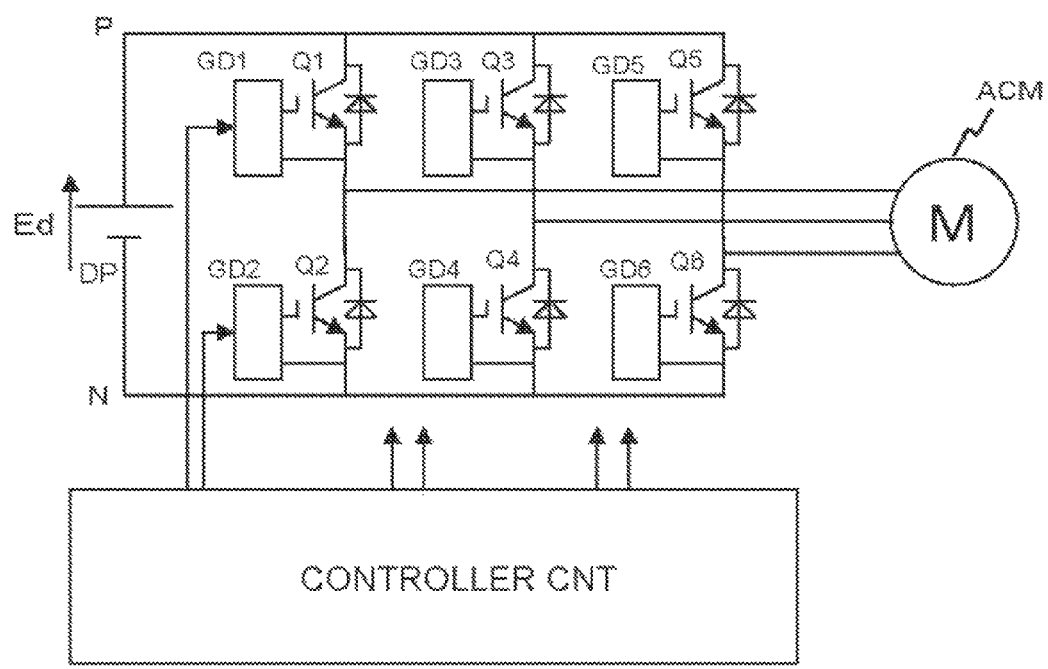
FIG. 4 shows a general inverter system.

The following describes a protection control system according to an embodiment of the present invention for a four-level power conversion circuit of a flying capacitor type. FIG. 1 shows a flow of an operation to shut down the main circuit at an event of arm short-circuit from a normally operating state; FIGS. 2(a)-2(d) shows a flow of protection operation in the case of a short-circuit fault of IGBT T3; and FIGS. 3(a)-3(d) shows a flow of protection operation in the case of a short-circuit fault of IGBT T4.

Referring to FIG. 1, when a short-circuit fault has occurred at the IGBT T3 and an arm-short-circuit is detected with the IGBT T4 in the block 28, the IGBTs T1, T5, and T6 are turned OFF in the block 29. In the blocks 30 and 31, the IGBT T2 is turned ON or, if in the ON state already, it is held ON. In the blocks 32 and 33, the IGBT T2 is turned OFF when the voltage $V_{C2}$ across the capacitor C2 decreases down to a predetermined voltage value.

Similarly, when a short-circuit fault has occurred at the IGBT T4 and an arm-short-circuit is detected with the IGBT T3 in the block 34, the IGBTs T1, T2, and T6 are turned OFF in the block 35. In the blocks 36 and 37, the IGBT T5 is turned ON or, if in the ON state already, it is held ON. In the blocks 38 and 39, the IGBT T5 is turned OFF when the voltage $V_{C2}$ across the capacitor C2 decreases down to a predetermined voltage value.

It is desirable to set the predetermined voltage value for the voltage $V_{C2}$ across the capacitor C2 to be about half the voltage Ed of the DC power supply DP. Explanation is omitted here about a well known circuit of voltage detection across the capacitor C2.

The voltage $V_{C1}$ across the capacitor C1, which is connected outside, or in the side toward the DC power supply terminals, of the faulted switching element is zero volts. And the voltage $V_{C2}$ across the capacitor C2, which is connected outside this capacitor C1, is made at a voltage in the middle between the voltage Ed of the DC power supply DP and the final voltage zero volts of the capacitor C1. Thus, the maximum voltage undergone by the switching elements T1, T2, T5 and T6 is restricted to one and a half of the normal value of Ed/3. In the conventional system as described previously, the IGBTs undergo a voltage of 2Ed/3, which is twice the normal value. Therefore, the semiconductor elements in the system of the embodiment of the invention can be with a smaller size and at a lower cost.

Figure 5:
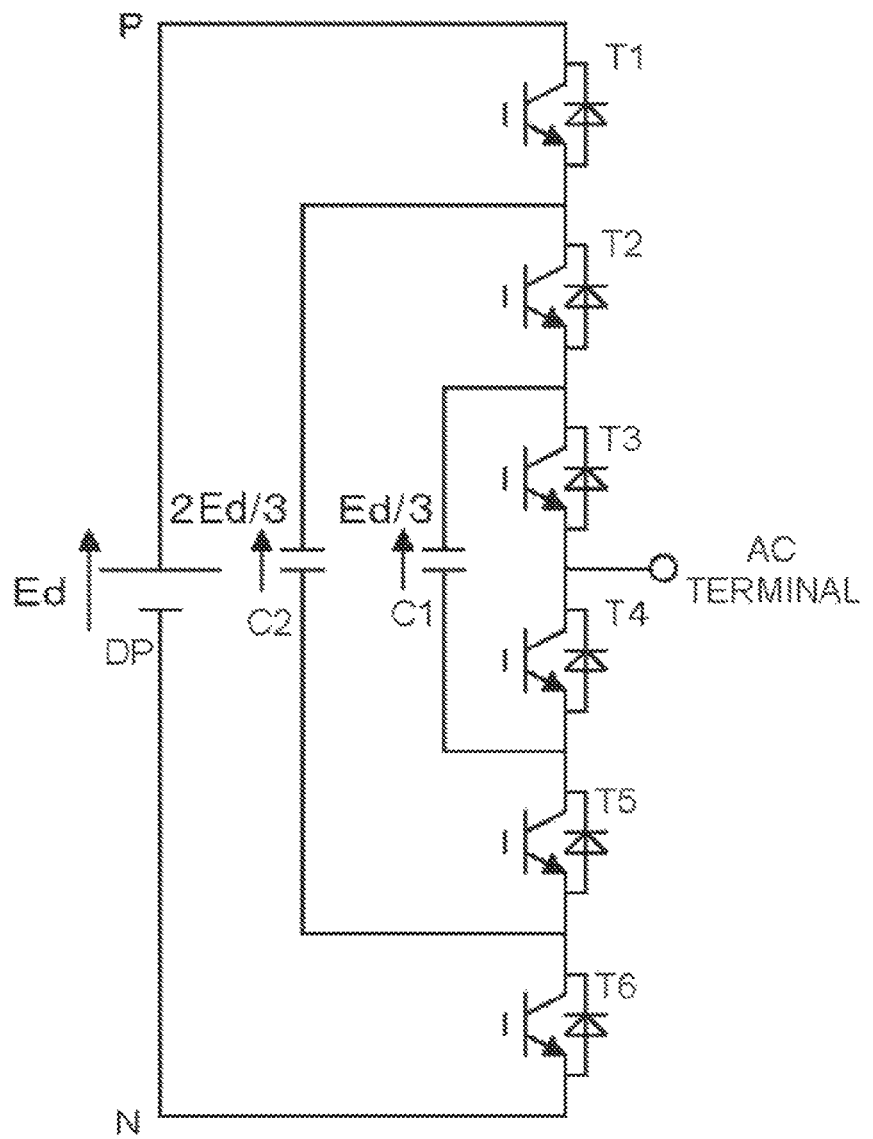
FIG. 5 shows a four-level power conversion circuit of a flying capacitor type.
Figure 7:
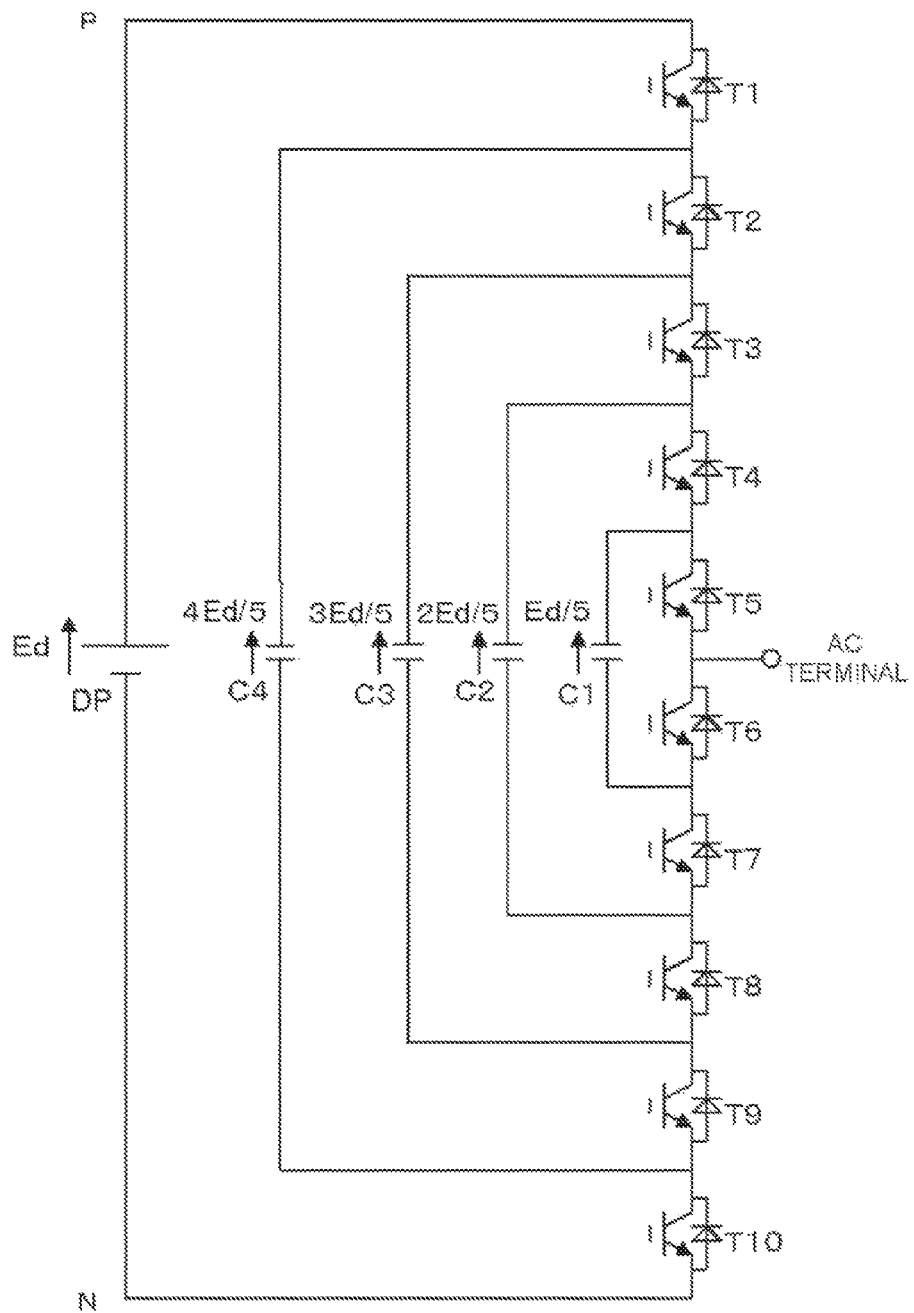
FIG. 7 shows a six-level power conversion circuit of a flying capacitor type.
Figure 8:
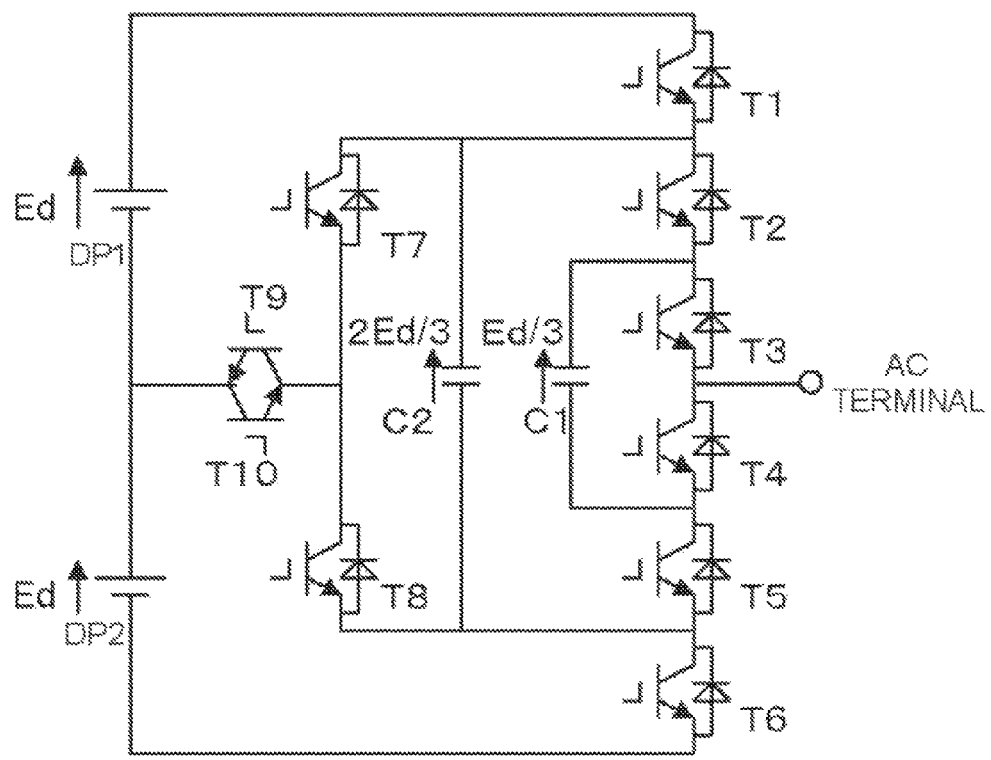
FIG. 8 shows a seven-level power conversion circuit of a flying capacitor type in combination with a neutral point clamped circuit.
Figure 9:
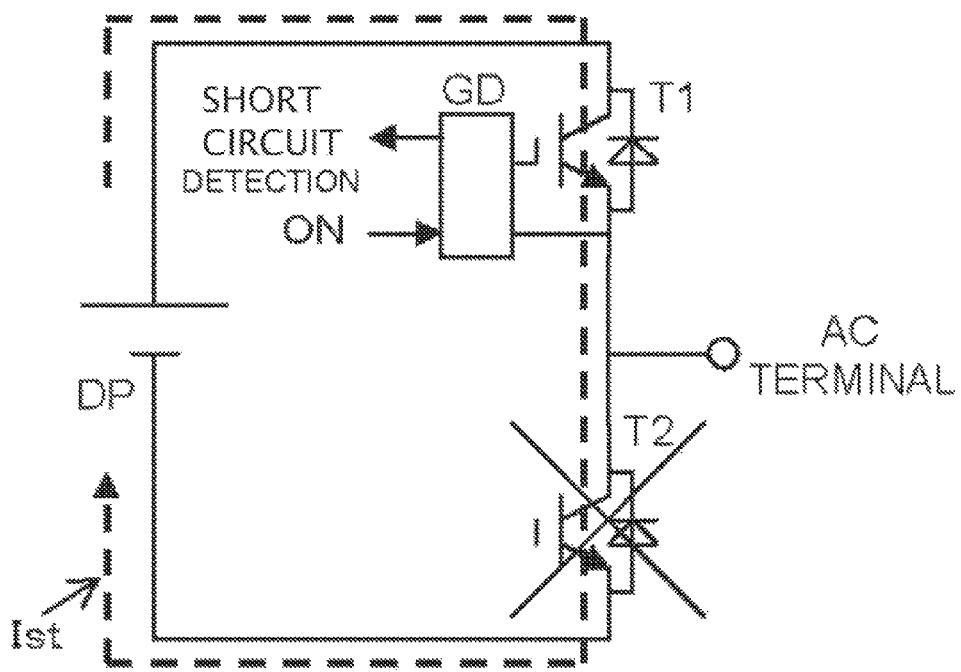
FIG. 9 illustrates operation in an event of arm short-circuit.
Figure 10:
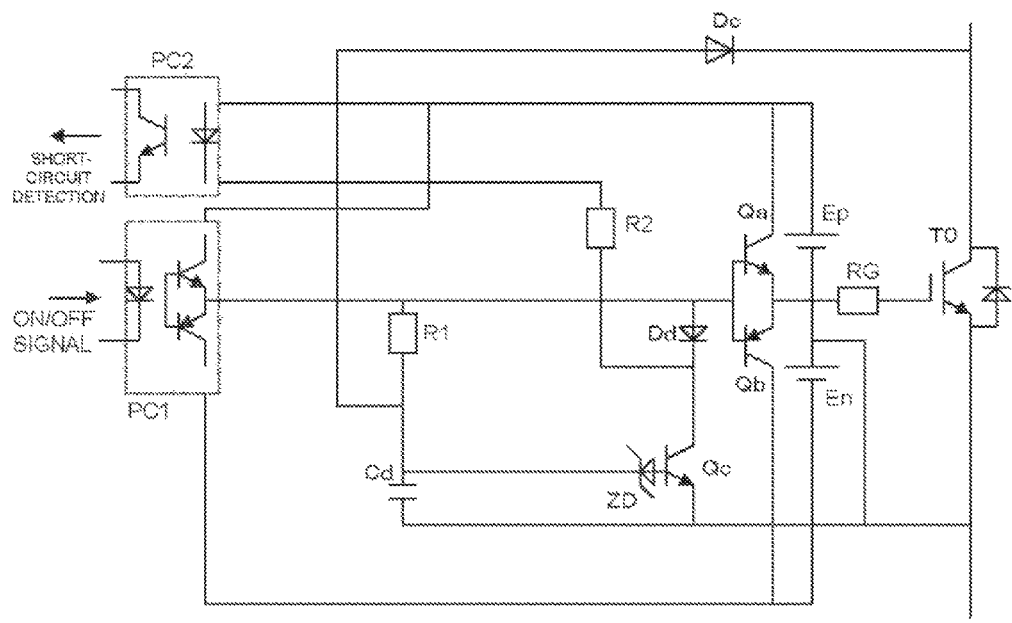
FIG. 10 shows a gate driving circuit having an arm short-circuit detecting circuit and a protection circuit.

The operation described above is the one in an embodiment for a four-level power conversion circuit of a flying capacitor type shown in FIG. 5 or an embodiment for a seven-level power conversion circuit of a flying capacitor type in combination with a neutral point clamped circuit shown in FIG. 8. However, the protection control system of the invention can be applied to multi-level power conversion circuits of flying capacitor type of more than four levels as shown in FIG. 6 and FIG. 7, as described in the following.

Embodiment Example 2

Figure 6:
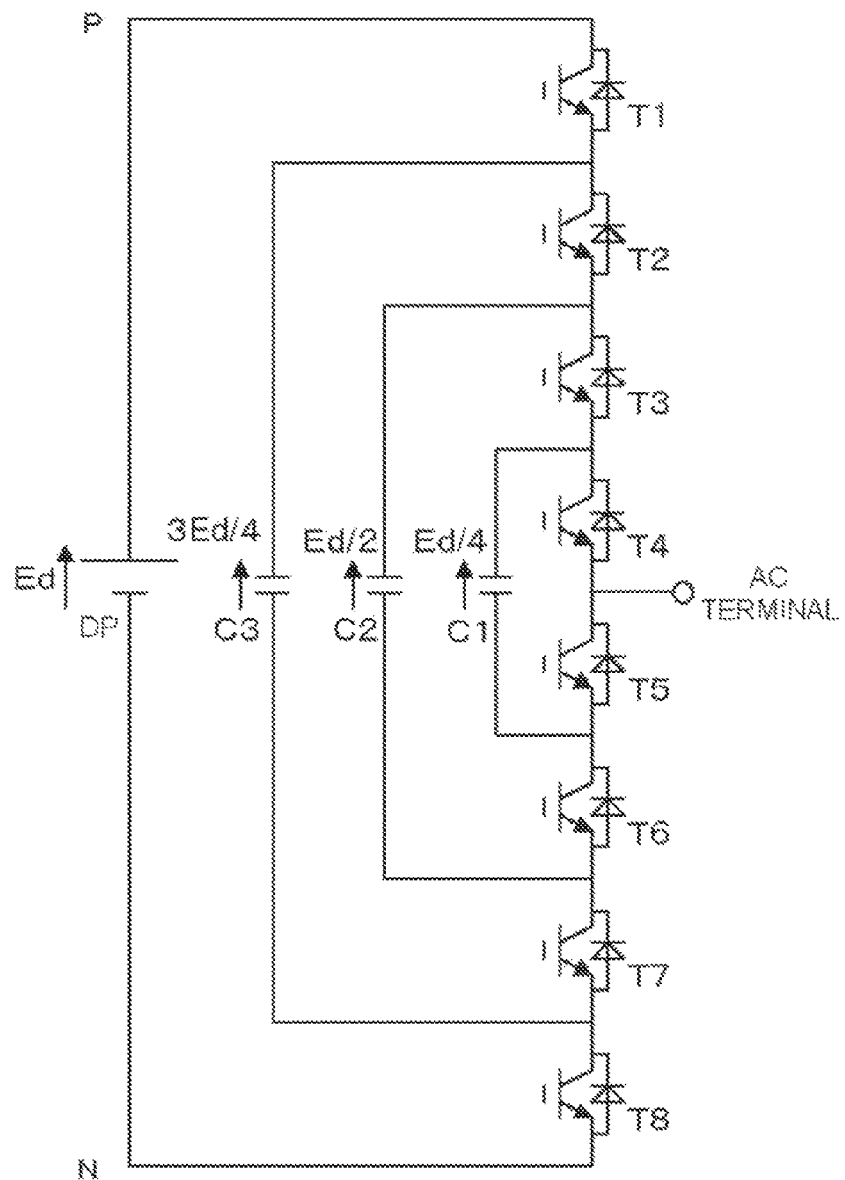
FIG. 6 shows a five-level power conversion circuit of a flying capacitor type.

The Embodiment Example 2 is an embodiment for a five-level power conversion circuit of a flying capacitor type as shown in FIG. 6. The Embodiment Example 2 is the case of N=4 in the following general expression for a circuit having 2 N semiconductor switches. Of the 2 N semiconductor switches connected in series between the positive terminal and the negative terminal of the DC power supply, the third semiconductor switch from the positive terminal or the negative terminal is supposed to be short-circuited, or a semiconductor switch at the side of the middle connection point of the third semiconductor switch is supposed to be short-circuited. The short-circuit current through the short-circuit fault semiconductor switch flows through a normally operating semiconductor switch, and the short circuit current is interrupted by this normally operating semiconductor switch. A semiconductor switch disposed at just outside of the fault semiconductor switch is turned ON. The outside here means the side toward the positive terminal or toward the negative terminal of the DC power supply. The semiconductor switch in the ON state is turn OFF when the voltage across the capacitor connected outside of the semiconductor switch in the ON state decreases down to a predetermined voltage value.

In this Embodiment Example 2, the semiconductor switches concerned that become into short-circuit fault state are IGBTs T4, T5, T3, and T6. The following describes operation and setting of the capacitor voltages in the cases of short-circuit of one of these four IGBTs.

(1) The Case of Short-Circuit Fault of IGBT T4

The short-circuit fault is detected by the IGBT T5. The IGBTs other than the IGBT T3 are turned OFF. The IGBT T3 is turned OFF when the voltage $V_{C2}$ across the capacitor C2 becomes about half the voltage $V_{C3}$ across the capacitor C3, that is, 3Ed/8.

(2) The Case of Short-Circuit Fault of IGBT T5

The short-circuit fault is detected by the IGBT T4. The IGBTs other than the IGBT T6 are turned OFF. The IGBT T6 is turned OFF when the voltage $V_{C2}$ across the capacitor C2 becomes about half the voltage $V_{C3}$ across the capacitor C3, that is, 3Ed/8.

(3) The Case of Short-Circuit Fault of IGBT T3

The short-circuit fault is detected by the IGBT T6. The IGBTs other than the IGBT T2 are turned OFF. The IGBT T2 is turned OFF when the voltage $V_{C3}$ across the capacitor C3 becomes about half the sum of the voltage Ed of the DC power supply and the voltage $V_{C1}$ across the capacitor C1, that is, 5Ed/8.

(4) The Case of Short-Circuit Fault of IGBT T6

The short-circuit fault is detected by the IGBT T3. The IGBTs other than the IGBT T7 are turned OFF. The IGBT T7 is turned OFF when the voltage $V_{C3}$ across the capacitor C3 becomes about half the sum of the voltage Ed of the DC power supply and the voltage $V_{C1}$ across the capacitor C1, that is, 5Ed/8. By controlling as described above, the maximum voltage undergone by the IGBTs is 3Ed/8.

Embodiment Example 3

The Embodiment Example 3 is an embodiment for a six-level power conversion circuit of a flying capacitor type as shown in FIG. 7. The Embodiment Example 3 is the case of N=5 in the following general expression for a circuit having 2 N semiconductor switches. Of the 2 N semiconductor switches connected in series between the positive terminal and the negative terminal of the DC power supply, the third semiconductor switch from the positive terminal or the negative terminal is supposed to be short-circuited, or a semiconductor switch at the side of the middle connection point of the third semiconductor switch is supposed to be short-circuited. The short-circuit current through the short-circuit fault semiconductor switch flows through a normally operating semiconductor switch, and the short circuit current is interrupted by this normally operating semiconductor switch. A semiconductor switch disposed at just outside of the fault semiconductor switch is turned ON. The outside here means the side toward the positive terminal or toward the negative terminal of the DC power supply. The semiconductor switch in the ON state is turned OFF when the voltage across the capacitor connected outside of the semiconductor switch in the ON state decreases down to a predetermined voltage value.

In this Embodiment Example 3, the semiconductor switches that can become into short-circuit fault state are IGBTs T5, T6, T4, T7, T3 and T8. The following describes operation and setting of the capacitor voltages in the cases of short-circuit fault of one of these four IGBTs.

(1) The Case of Short-Circuit Fault of IGBT T5

The short-circuit fault is detected by the IGBT T6. The IGBTs other than the IGBT T4 are turned OFF. The IGBT T4 is turned OFF when the voltage $V_{C2}$ across the capacitor C2 becomes about half the voltage $V_{C3}$ across the capacitor C3, that is, 3Ed/10.

(2) The Case of Short-Circuit Fault of IGBT T6

The short-circuit fault is detected by the IGBT T5. The IGBTs other than the IGBT T7 are turned OFF. The IGBT T7 is turned OFF when the voltage $V_{C2}$ across the capacitor C2 becomes about half the voltage $V_{C3}$ across the capacitor C3, that is, 3Ed/10.

(3) The Case of Short-Circuit Fault of IGBT T4

The short-circuit fault is detected by the IGBT T7. The IGBTs other than the IGBT T3 are turned OFF. The IGBT T3 is turned OFF when the voltage $V_{C3}$ across the capacitor C3 becomes about half the sum of the voltage $V_{C4}$ across the capacitor C4 and the voltage $V_{C1}$ across the capacitor C1, that is, Ed/2.

(4) The Case of Short-Circuit Fault of IGBT T7

The short-circuit fault is detected by the IGBT T4. The IGBTs other than the IGBT T8 are turned OFF. The IGBT T8 is turned OFF when the voltage $V_{C3}$ across the capacitor C3 becomes about half the sum of the voltage $V_{C4}$ across the capacitor C4 and the voltage $V_{C1}$ across the capacitor C1, that is, Ed/2.

(5) The Case of Short-Circuit Fault of IGBT T3

The short-circuit fault is detected by the IGBT T8. The IGBTs other than the IGBT T2 are turned OFF. The IGBT T2 is turned OFF when the voltage $V_{C4}$ across the capacitor C4 becomes about half the sum of the voltage Ed of the DC power supply and the voltage $V_{C2}$ across the capacitor C2, that is, 7Ed/10.

(6) The Case of Short-Circuit Fault of IGBT T8

The short-circuit fault is detected by the IGBT T3. The IGBTs other than the IGBT T9 are turned OFF. The IGBT T9 is turned OFF when the voltage $V_{C4}$ across the capacitor C4 becomes about half the sum of the voltage Ed of the DC power supply and the voltage $V_{C2}$ across the capacitor C2, that is, 3Ed/10.

In similar ways, the protection control system of the invention can be applied to all multilevel power conversion circuits of the flying capacitor type excepting a three-level circuit. The maximum voltage undergone by the semiconductor switches can be restricted within one and the half of the average voltage in the steady state.

The present invention is applied to power inverter circuits for obtaining multilevel AC voltage from a small number of DC power supplies and also to rectifying circuits that performs reversed power conversion. Actual applications include high voltage motor driving equipment and power converter equipment for grid connection.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-134361, filed on Jun. 14, 2012, the contents of which are incorporated herein by reference.

What is claimed is:

1. A protection control system for a multilevel power conversion circuit of a flying capacitor type for converting a DC power into an AC power or converting an AC power into a DC power, one phase portion of the power conversion circuit comprising:
   six semiconductor switches of first through sixth semiconductor switches sequentially connected in series from a positive terminal to a negative terminal of a DC power supply circuit, each semiconductor switch having an antiparallel-connected diode;
   a gate driving circuit with an arm short-circuit protection circuit connected to a gate terminal of each semiconductor switch;
   a first capacitor connected between a connection point of the second and third semiconductor switches and a connection point of the fourth and fifth semiconductor switch;
   a second capacitor connected between a connection point of the first and second semiconductor switches and a connection point of the fifth and sixth semiconductor switches; and
   an AC terminal at a connection point of the third and fourth semiconductor switches; wherein the protection control system turns ON the second semiconductor switch or maintains the second semiconductor switch in an ON state, in a case of short-circuit fault of the third semiconductor switch.

2. The protection control system for a multilevel power conversion circuit according to claim 1, wherein the second or fifth semiconductor switch is turned OFF when the voltage across the second capacitor decreases to a predetermined voltage value after the second or fifth semiconductor switch has been turned ON.

3. The protection control system for a multilevel power conversion circuit according to claim 2, wherein the predetermined voltage value is approximately 50% of a voltage value of the DC power supply.

4. The protection control system for a multilevel power conversion circuit according to claim 2, wherein the multilevel power conversion circuit is a multilevel power conversion circuit of a flying capacitor type in combination with a neutral point clamped circuit that is additionally provided and composed of a semiconductor switch for clamping the electric potential of the second capacitor at a neutral point electric potential of the DC power supply, and the predetermined voltage value is approximately ⅙ of a voltage value of the DC power supply.

5. A protection control system for a multilevel power conversion circuit of a flying capacitor type for converting a DC power into an AC power or converting an AC power into a DC power, one phase portion of the power conversion circuit comprising:
- six semiconductor switches of first through sixth semiconductor switches sequentially connected in series from a positive terminal to a negative terminal of a DC power supply circuit, each semiconductor switch having an antiparallel-connected diode;
- a gate driving circuit with an arm short-circuit protection circuit connected to a gate terminal of each semiconductor switch;
- a first capacitor connected between a connection point of the second and third semiconductor switches and a connection point of the fourth and fifth semiconductor switch;
- a second capacitor connected between a connection point of the first and second semiconductor switches and a connection point of the fifth and sixth semiconductor switches; and
- an AC terminal at a connection point of the third and fourth semiconductor switches; wherein the protection control system turns ON the fifth semiconductor switch or maintains the fifth semiconductor switch in an ON state, in a case of short-circuit fault of the fourth semiconductor switch.

6. A protection control system for a five-level or more levels of power conversion circuit of a flying capacitor type for converting a DC power into an AC power or converting an AC power into a DC power, one phase portion of the power conversion circuit comprising:
- 2 N pieces of semiconductor switches, N being an integer of four or larger, sequentially connected in series from a positive terminal to a negative terminal of a DC power supply circuit, each semiconductor switch having an antiparallel-connected diode;
- a gate driving circuit with an arm short-circuit protection circuit connected to a gate terminal of each semiconductor switch; and
- (N−1) pieces of capacitors connected between a connection point of the (N−I+1)-th and (N−I)-th semiconductor switches and a connection point of the (N+I)-th and (N+I+1)-th semiconductor switches, I being an integer from 1 to (N−1);

wherein when a J-th semiconductor switch, J being an integer from 3 to (2N−2), becomes in a short-circuit fault state, short-circuit current is interrupted by a normally operating semiconductor switch in which the short-circuit current running through the semiconductor switch in the short-circuit fault state flows, and the protection control system turns ON, or maintains in an ON state, the (J−1)-th semiconductor switch if J≤N or the (J+1)-th semiconductor switch if J≥(N+1), which is then turned OFF when the voltage across the (J+1)-th capacitor decreases to a predetermined voltage value.

7. The protection control system for a multilevel power conversion circuit according to claim 6, wherein the predetermined voltage value is approximately a middle voltage value between a final voltage value that the (J−1)-th capacitor reaches and a voltage value of the (J+2)-th capacitor.

8. The protection control system for a multilevel power conversion circuit according to claim 6, wherein the multilevel power conversion circuit is a multilevel power conversion circuit of a flying capacitor type in combination with a neutral point clamped circuit that is additionally provided and composed of a semiconductor switch for clamping the electric potential of either one of the (N−1) pieces of capacitors at a neutral point electric potential of the DC power supply, and the predetermined voltage value is approximately an average voltage value of the (J−2)-th capacitor in a normally operating state.

\* \* \* \* \*